(12) United States Patent
Azarfar et al.

(10) Patent No.: US 12,234,863 B2
(45) Date of Patent: Feb. 25, 2025

(54) METHOD OF DETERMINING THE CENTER OF LOADING OF A ROLLING ELEMENT

(71) Applicant: AKTIEBOLAGET SKF, Gothenburg (SE)

(72) Inventors: Alireza Azarfar, Utrecht (NL); Andreas Clemens van der Ham, Utrecht (NL); Dominik Fritz, Würzburg (DE); Stefan Engbers, Wuerzburg (DE); Juergen Reichert, Donnersdorf (DE); Defeng Lang, Delft (NL)

(73) Assignee: AKTIEBOLAGET SKF, Gothenburg (SE)

( * ) Notice: Subject to any disclaimer, the term of this patent is extended or adjusted under 35 U.S.C. 154(b) by 829 days.

(21) Appl. No.: 17/394,608

(22) Filed: Aug. 5, 2021

(65) Prior Publication Data

US 2023/0038874 A1    Feb. 9, 2023

(51) Int. Cl.
| | |
|---|---|
| *F16C 41/00* | (2006.01) |
| *F16C 33/34* | (2006.01) |
| *G01L 1/16* | (2006.01) |
| *G01L 5/00* | (2006.01) |
| *G01M 13/04* | (2019.01) |
| *G01P 1/02* | (2006.01) |

(Continued)

(52) U.S. Cl.
CPC ............... *F16C 41/00* (2013.01); *F16C 33/34* (2013.01); *G01L 1/162* (2013.01); *G01L 5/0009* (2013.01); *G01L 5/0019* (2013.01); *G01M 13/04* (2013.01); *G01P 1/023* (2013.01); *G01P 1/127* (2013.01); *G01P 15/00* (2013.01); *G06F 7/44* (2013.01); *G06F 7/485* (2013.01); *G06F 7/4876* (2013.01); *G06F 17/11* (2013.01); *F16C 2233/00* (2013.01)

(58) Field of Classification Search
CPC ...... F16C 41/00; F16C 33/34; F16C 2233/00; F16C 19/26; F16C 19/522; G01L 1/162; G01L 5/0009; G01L 5/0019; G01L 5/0004; G01M 13/04; G01P 1/023; G01P 1/127; G01P 15/00; G06F 7/44; G06F 7/485; G06F 7/4876; G06F 17/11
See application file for complete search history.

(56) References Cited

U.S. PATENT DOCUMENTS

| | | | | |
|---|---|---|---|---|
| 5,952,587 A | * | 9/1999 | Rhodes | G01L 5/0019 73/862.541 |
| 9,127,649 B2 | * | 9/2015 | Matsuda | F16C 33/526 |

(Continued)

FOREIGN PATENT DOCUMENTS

| | | | | | |
|---|---|---|---|---|---|
| CN | 110006648 A | * | 7/2019 | | G01L 1/16 |
| WO | WO-2005040745 A1 | * | 5/2005 | | F16C 19/522 |

*Primary Examiner* — Shelby A Turner
*Assistant Examiner* — Yaritza H Perez Bermudez
(74) *Attorney, Agent, or Firm* — J-TEK LAW PLLC; Scott T. Wakeman; Mark A. Ussai

(57) ABSTRACT

A method of determining the center of loading of a rolling element includes providing a rolling element body and at least three load sensors. The sensors are each positioned within a bore of the rolling element body at a separate distance from a reference position. Load measurements are taken with each one of the sensors at various positions about the circumference of the bearing and the center of loading is calculated at each one of the positions to determine the variation in axial loading about the bearing circumference.

19 Claims, 8 Drawing Sheets

(51) Int. Cl.

| | | |
|---|---|---|
| *G01P 1/12* | (2006.01) | |
| *G01P 15/00* | (2006.01) | |
| *G06F 7/44* | (2006.01) | |
| *G06F 7/485* | (2006.01) | |
| *G06F 7/487* | (2006.01) | |
| *G06F 17/11* | (2006.01) | |

(56) References Cited

U.S. PATENT DOCUMENTS

| | | | |
|---|---|---|---|
| 10,082,178 B2 * | 9/2018 | Dop | F16C 33/34 |
| 10,352,364 B2 * | 7/2019 | Kiyonaga | F16C 19/522 |
| 10,371,206 B2 | 8/2019 | van der Ham et al. | |
| 2018/0003227 A1 * | 1/2018 | Gerrit-Jan | F16C 33/366 |
| 2019/0203773 A1 | 7/2019 | Den Haak et al. | |
| 2022/0042879 A1 * | 2/2022 | Zhou | G01M 13/04 |
| 2023/0038874 A1 * | 2/2023 | Azarfar | G01P 1/127 |

\* cited by examiner

METHOD OF DETERMINING THE CENTER OF LOADING OF A ROLLING ELEMENT

BACKGROUND OF THE INVENTION

The present invention relates to bearings, and more particularly to sensorized rolling elements for bearings.

Rolling element bearings are well known and basically include inner and outer races and a plurality of rolling elements disposed between the races. Such bearings rotatably couple inner and outer members, for example an inner rotatable shaft and a fixed outer housing or casing, and transfers loading between the coupled members. In certain applications, a bearing may be provided with one or more sensors, such as strain gages mounted on the inner race and/or the outer race, to detect loading on the bearing or other properties of the bearing, for example, loading, temperature, vibration, etc.

SUMMARY OF THE INVENTION

In one aspect, the present invention is a method of determining the center of loading of a rolling element, the rolling element being disposed between and rotatably coupling a bearing inner race and a bearing outer race. The method comprises the steps of: providing a rolling element body and at least two load sensors; forming a cavity within the rolling element body such that an axis extends through the cavity; positioning a first one of the two load sensors within the cavity at a first distance (D1) along the axis from a reference axial position and positioning a second one of the two load sensors within the cavity at a second distance (D2) along the axis from the reference axial position; disposing the rolling element body between the first race and the second race; taking a first load measurement (L1) using the first sensor and a second load measurement (L2) using the second sensor as the rolling element body traverses a circular path between the first race and the second race; and calculating a center of loading on the rolling element body using the following equation:

$$\text{center of loading} = \frac{L1*D1 + L2*D2}{L1 + L2}$$

In another aspect, the present invention is again a method of determining the center of loading of a rolling element as basically described in the preceding paragraph, except that three or more sensors are provided, as indicated by the variable number (n). The steps of the method are the same as described, with the following modified steps: positioning each one of the number (n) of load sensors within the bore at a separate distance (Dn) along the axis from a reference axial position, the value of each distance (Dn) being different than the value of each other distance (Dn); taking a load measurement (Ln) using each one of the number (n) of the sensors; and calculating a center of loading on the rolling element body using the following equation:

$$\text{center of loading} = \frac{L1*D1 + L2*D2 + L3*D3 \ldots + Ln*Dn}{L1 + L2 + L3 \ldots + Ln}$$

In a further aspect, the present invention is a sensorized roller for a bearing having an inner race and an outer race. The sensorized roller comprises a body disposeable between the inner and outer races and having two opposing axial ends, a bore extending between the two axial ends, and a central axis extending through the bore. A first load sensor is disposed within the bore so as to be located at a first distance (D1) along the axis from a reference axial position and a second load sensor disposed within the bore so as to be located at a second distance (D2) along the axis from the reference axial position. A processor is disposed within the bore of the rolling element body and is electrically connected with each one of the first load sensor and the second load sensor. The processor is configured to calculate an axial position of the center of loading on the rolling element body from measurements received from each one of the first load sensor and the second load sensor.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
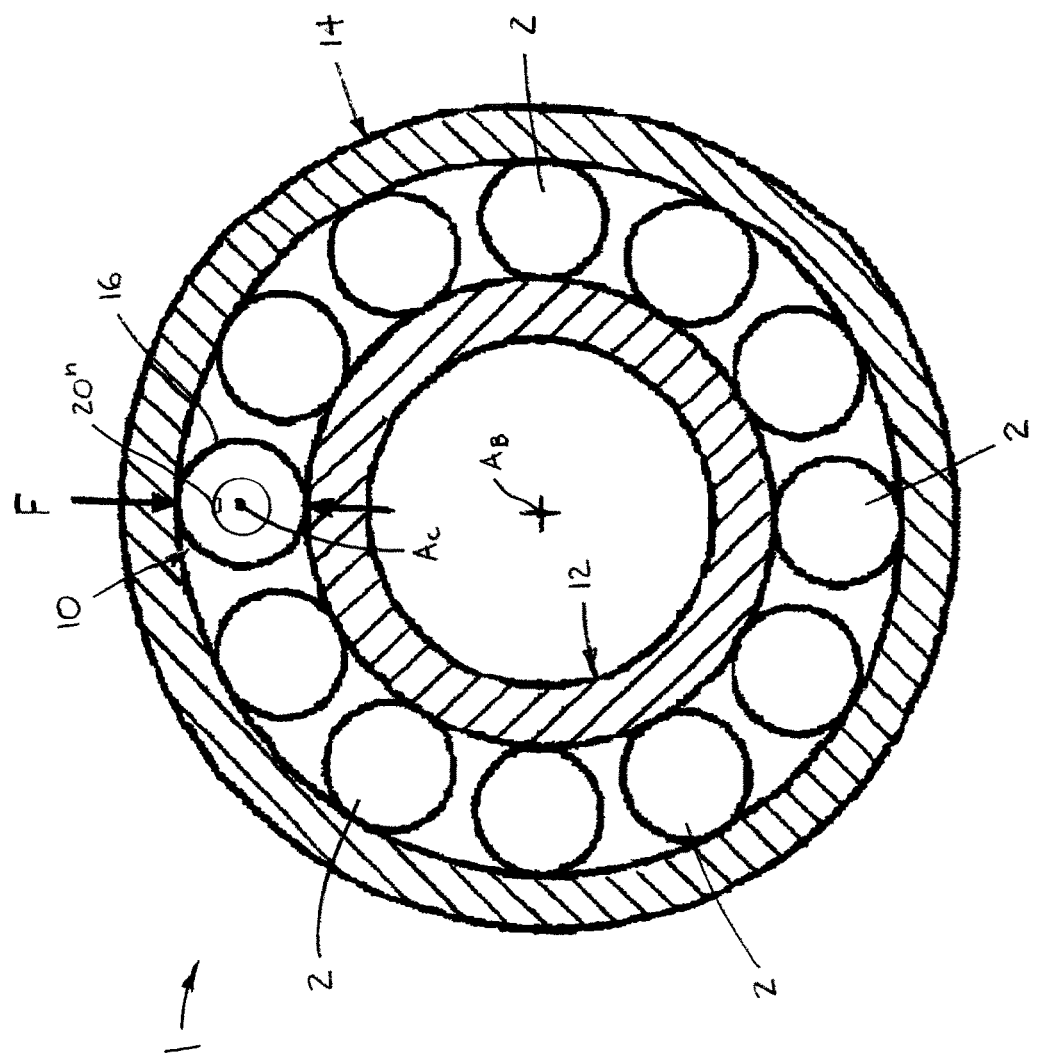
FIG. 1 is a side radial cross-sectional view of a bearing having a sensorized roller used to practice the method of the present invention.
Figure 2:
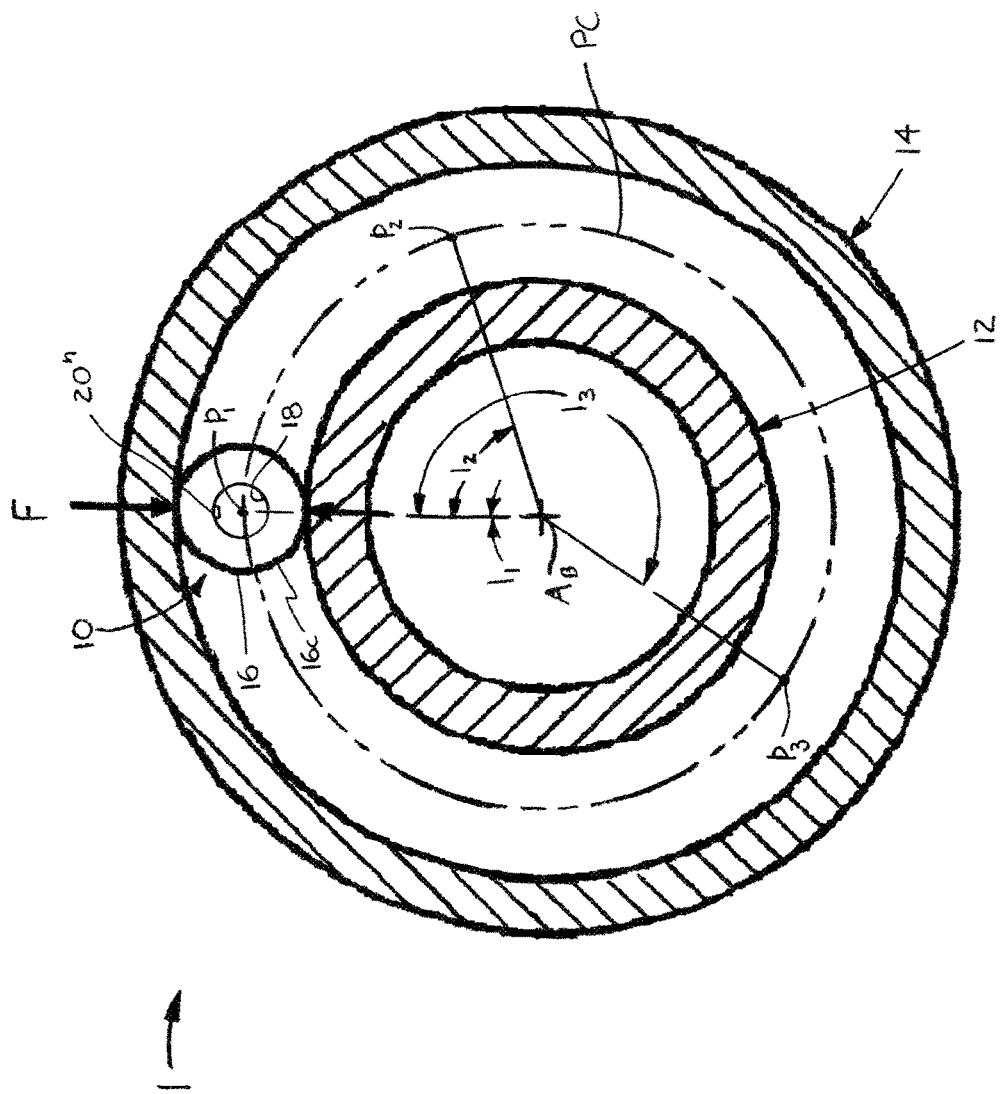
FIG. 2 is another view of the bearing of FIG. 1, shown without standard rollers and indicating the circular path of the sensorized roller within the bearing.
Figure 3:
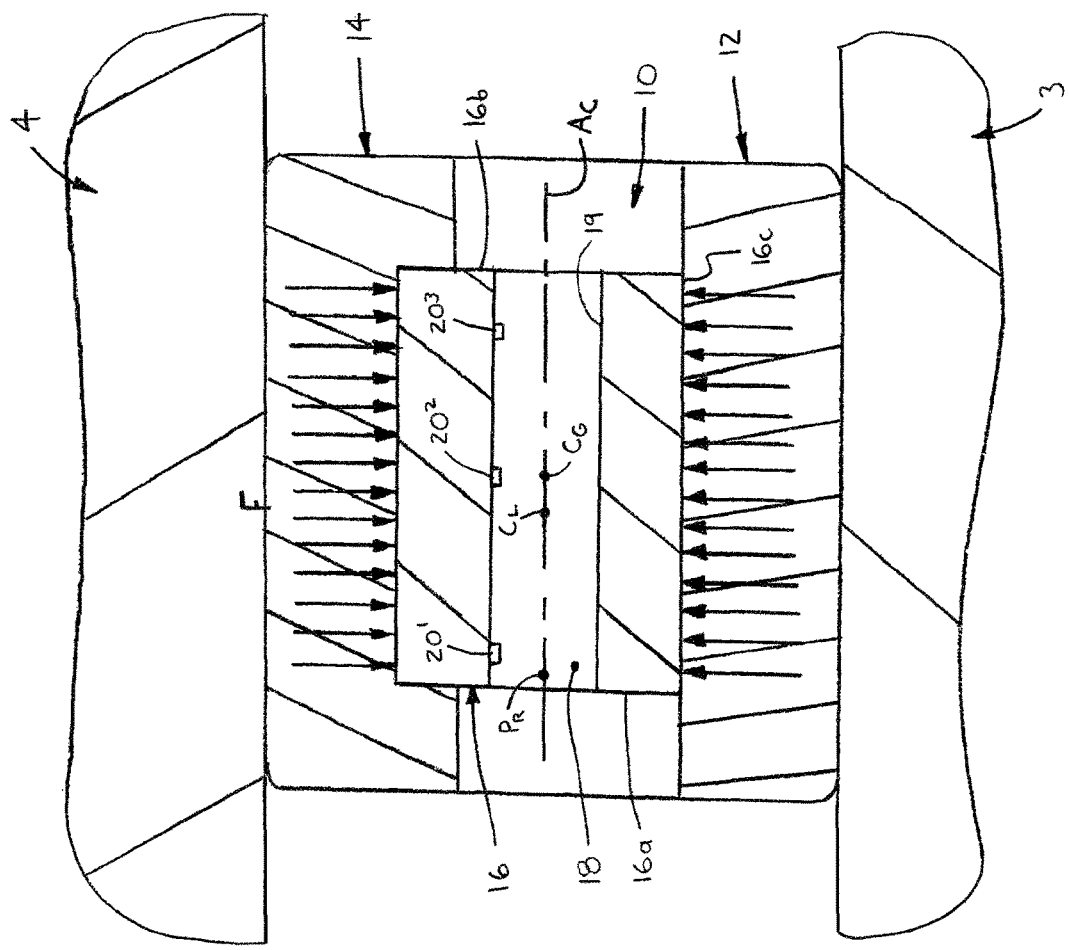
FIG. 3 is an axial cross-sectional view of the sensorized roller within the bearing.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a method of determining the axial position (i.e., along a central axis) of the center of loading $C_L$ of a rolling element 10 of a bearing 1. The rolling element 10 is disposed between and rotatably couples (i.e., with other rolling elements 2) a bearing inner race 12 and a bearing outer race 14 and supports and transfers loading or forces F between the races 12, 14. A rolling element body 16 and at least two (and preferably at least three) load sensors 20n are provided, which are ideally mounted on a frame 30 as described below. The rolling element body 16 is preferably a cylindrical or tapered roller having opposing axial ends 16a, 16b and a cylindrical or tapered outer circumferential surface 16c which rolls against the inner and outer races 12, 14, but may alternatively be a spherical or toroidal (i.e., "CARB") rolling element in which the outer surface 16c is generally curved or elliptical. A cavity or bore 18 is formed within the rolling element body 16 so as to extend between the two axial ends 16a, 16b of the body 16, the bore 18 being defined by an inner circumferential surface 19, and a central axis $A_C$ extends through the bore 18 between the body axial ends 16a, 16b.

Figure 4:
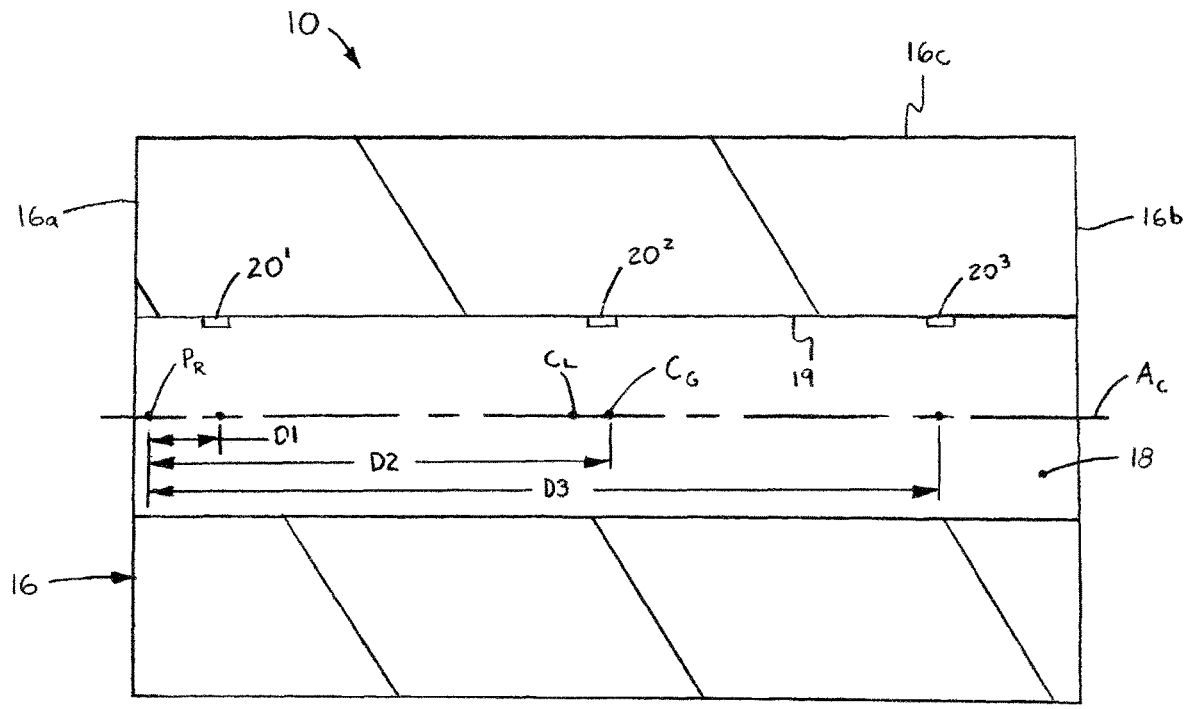
FIG. 4 is an enlarged, axial cross-sectional view of a sensorized roller indicating the positioning of three load sensors relative to an end reference position.
Figure 5:
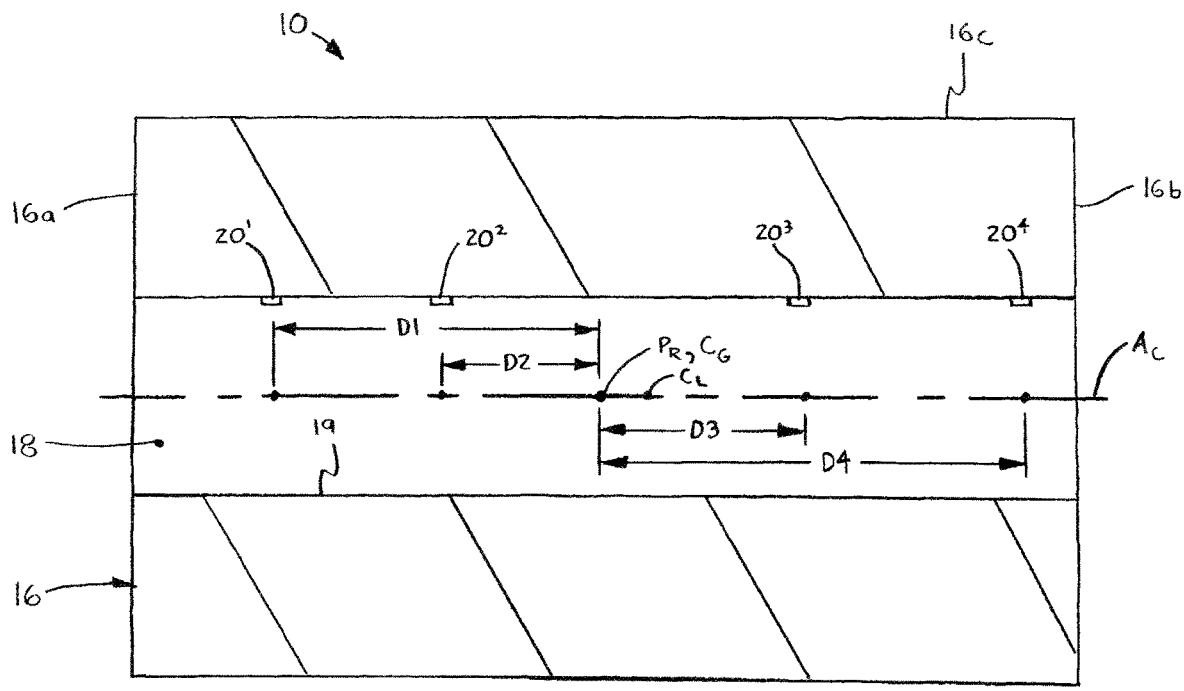
FIG. 5 is another enlarged, axial cross-sectional view of a sensorized roller indicating the positioning of four load sensors relative to a central reference position.
Figure 6:
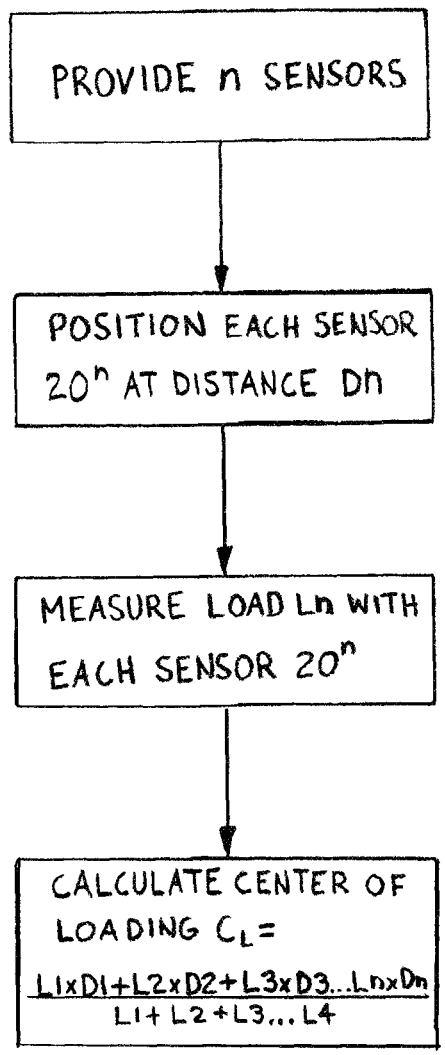
FIG. 6 is a flow diagram of a basic method of calculating the center of loading of a bearing roller.

As indicated in FIGS. 4 and 5, at least a first load sensor 20$^1$ is positioned within the bore 18 at a first distance D1 along the axis $A_C$ from a reference axial position $P_R$ and a second load sensor 20$^2$ is positioned within the bore 18 at a second distance D2 along the axis $A_C$ from the reference axial position $P_R$. Preferably, a third sensor 20$^3$ is positioned within the bore 18 at a third distance D3 along the axis $A_C$ from the reference axial position $P_R$. The reference axial position $P_R$ may be located at about the geometric center $C_G$ of the rolling element body 16 (as depicted in FIG. 5), adjacent to one axial end 16a or 16b of the body 16 (as shown in FIG. 4), or at any other desired or convenient position along the central axis $A_C$. In any case, after installation of the sensors 20$^1$, 20$^2$, 20$^3$, . . . 20$^n$, and other electronic components described below, the rolling element 10 is now "sensorized".

After fabricating the sensorized rolling element 10, the rolling element body 16 is disposed or positioned between the first race 12 and the second race 14, along with a number of standard or non-sensorized rolling elements 2 necessary to support loading or forces F between the two races 12, 14. A first load measurement L1 is taken using the first sensor 20$^1$ and a second load measurement L2 is taken using the second sensor 20$^2$, and preferably a third load measurement L3 is taken using the third sensor 20$^3$, as the rolling element body 16 traverses a circular path PC (FIG. 2) between the first race 12 and the second race 14. Using at least the two load measurements L1 and L2, a center of loading $C_L$ on the rolling element body 16 is calculated using the following equation (wherein * indicates multiplication):

$$\text{center of loading } C_L = \frac{L1*D1 + L2*D2}{L1 + L2}$$

With the preferred third sensor 20$^3$ taking a third load measurement L3, the center of loading $C_L$ is calculated as follows:

$$\text{center of loading } C_L = \frac{L1*D1 + L2*D2 + L3*D3}{L1 + L2 + L3}$$

Further, when it is desired to utilize four or more sensors 20$^n$, each one of the particular number (n) of sensors 20$^n$, i.e., a first sensor 20$^1$, a second sensor 20$^2$, a third sensor 20$^3$ . . . and an "nth" sensor 20$^n$, are each positioned within the bore 18 at a distance (Dn) from the reference axial position $P_R$ different than the distance (Dn) of each other sensor 20$^n$ from the reference axial position $P_R$. Then, a separate load measurement (Ln) is taken with each one of the number (n) of load sensors 20$^n$ and the location or position of the center of loading $C_L$ is calculated using the following equation:

$$\text{center of loading } C_L = \frac{L1*D1 + L2*D2 + L3*D3 + \ldots Ln*Dn}{L1 + L2 + L3 \ldots + Ln}$$

It must be noted that each of the above equations calculate the location of the center of loading $C_L$ along the central axis $A_C$ relative to the reference axial position $P_R$. When the reference position $P_R$ is located adjacent to one of the axial ends 16a or 16b, the values of all of the distances D1, D2, D3, etc. are positive. Alternatively, when the reference position $P_R$ is inboard of the axial ends 16a, 16b, such as at the axial or geometric center $C_G$ between the ends 16a, 16b, one or more sensors 20 are located at positions in which the distance "D" from the reference position $P_R$ will have a negative value. Particularly with a cylindrical roller, the center of loading $C_L$ should ideally be located at the geometric center $C_G$ of the rolling element body 16 or the "axial" center, i.e., the midpoint of the axis $A_C$ between the ends 16a, 16b.

However, when there are defects in the bearing 1, such as insufficient concentricity or roundness of one or both of the races 12, 14, defects in the raceway surfaces (e.g., galling, spalling), improper installation of the bearing 1 in an assembly, such as between a shaft 3 and a housing 4 (FIG. 3), etc., the center of loading $C_L$ may be offset from the geometric center $C_G$ of the rolling element 10. Such issues or defects may vary about the circumference of the bearing 1, causing the actual center of loading $C_L$ on the rolling element 10 to vary at different positions $p_n$ about the circular path PC. Therefore, monitoring the location of the center of loading $C_L$ over time can enable detection of a defect in a bearing 1 and allow the bearing 1 to be replaced prior to a failure that may cause significant or catastrophic damage.

As such, the center of loading $C_L$ is preferably calculated at various positions $p_n$, e.g., $p_1$, $p_2$, $p_3$ (indicated in FIG. 2), about the circumference of the bearing 1 in order to assess the manner of variation in the axial location of the center of loading $C_L$. In order to determine or identify the particular positions $p_n$ about the circular path PC at which the loading center $C_L$ is calculated, an acceleration sensor 22 is provided and disposed within the bore 18 of the rolling element body 16. Then, an acceleration measurement is taken using the acceleration sensor 22 at each one of a plurality of positions $p_n$ of the rolling element body 16 about the circular path PC. The specific location $l_n$ (e.g., $l_1$, $l_2$, $l_3$) of each one of the positions $p_n$ (e.g., $p_1$, $p_2$, $p_3$) of the rolling element body 16 about the circular path PC is calculated using the acceleration measurement taken at each position $p_n$, preferably as an angular value (e.g., in radians). Simultaneously, the load measurements L1, L2, L3, . . . Ln are taken at each position $p_n$ and the center of loading $C_L$ is determined at each one of the calculated locations $l_n$ on the circular path PC.

Figure 7:
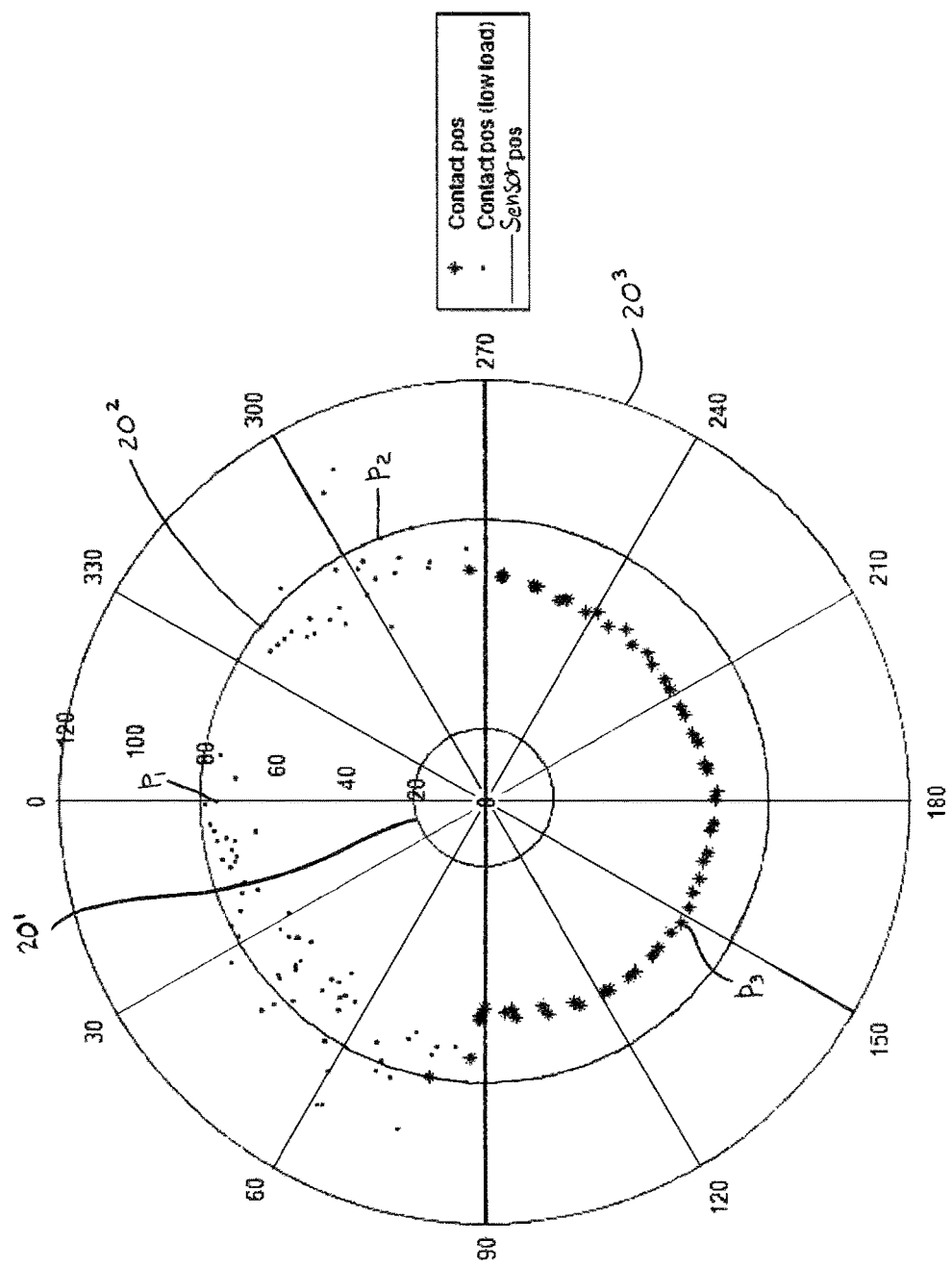
FIG. 7 is a graph depicting the calculated center of loading at various angular positions about the bearing races.

Thereafter, the calculated center of loading $C_L$ may be correlated with each one the calculated locations $l_n$ on the circular path PC to provide an indication of the variation in the center of loading $C_L$ as the rolling element 10 traverses the circular path PC between the races 12, 14. Preferably, the calculated center of loading $C_L$ at each determined position $l_n$ on the circular path PC is plotted to form a graph, for example as shown in FIG. 7. In this graph, each position $p_n$ is depicted as the angular location $l_n$ about the bearing axis $A_B$, and the location of each sensor $20''$ (in this example, $20^1$, $20^2$ and $20^3$) is indicated as a separate circle having a diameter equal to the distance Dn of each sensor $20n$ from the reference axial position $P_R$.

Preferably, a processor 24 is provided and disposed within the bore 18 of the rolling element body 16 so as to be electrically connected with each one of the sensors $20^1$, $20^2$, $20^3$, ... $20''$, and preferably also with the acceleration sensor 22. As such, the calculation of the center of loading $C_L$, as well as the calculation of the angular location $l_n$ of each position $p_n$, is preferably performed by the processor 24. Further, a transmitter 26 is also preferably provided and disposed within the rolling body bore 18 so as to be electrically connected with the processor 24. With such a transmitter 26, signals corresponding to the calculated center of loading $C_L$, and preferably also the calculated angular locations $l_n$, may be relayed by means of the transmitter 26 to be received by an appropriate device such as a remote computer (none shown).

Figure 8:
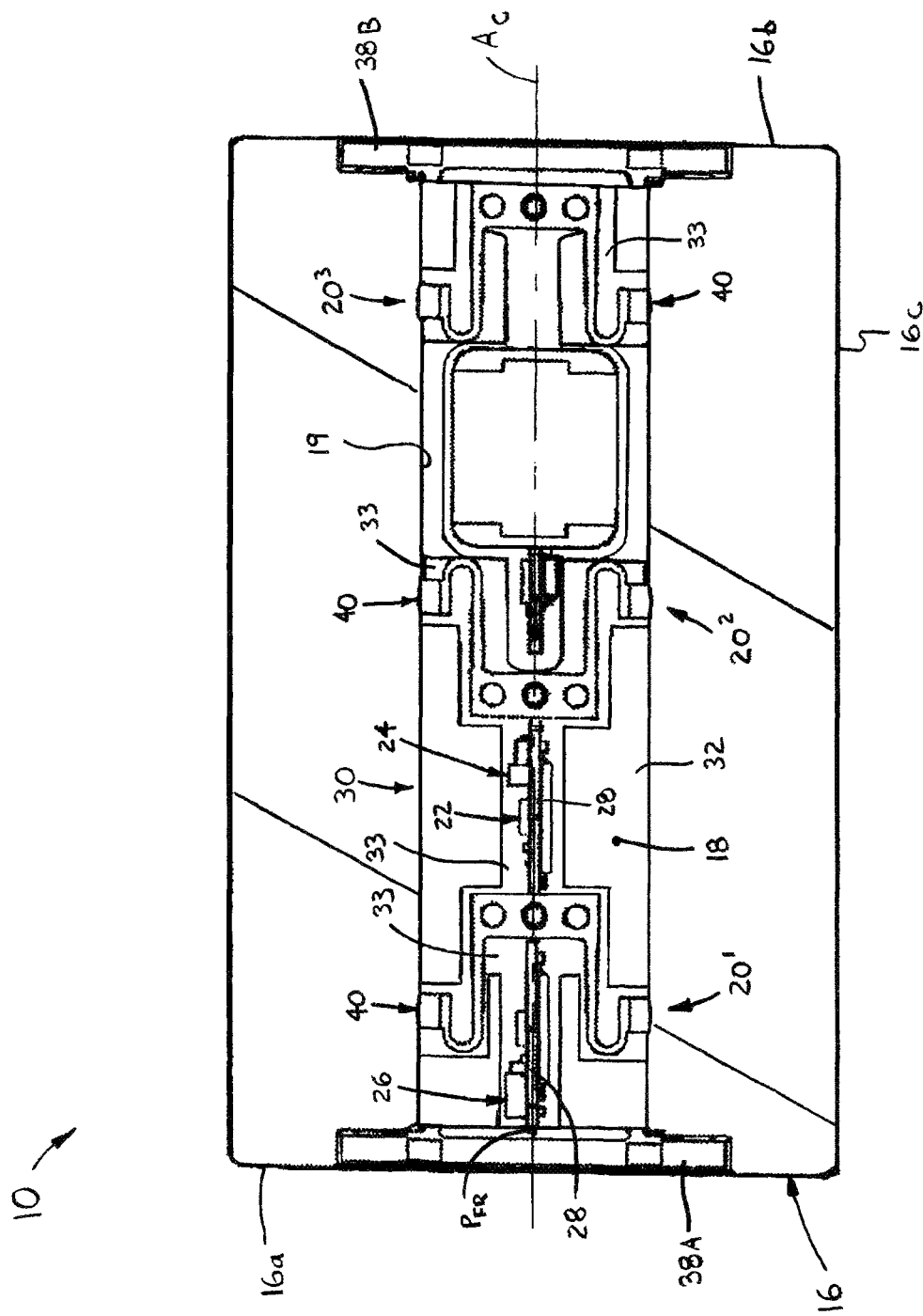
FIG. 8 is another axial cross-sectional view of a sensorized roller showing a preferred constructions of the load sensors and other electronic components of the roller.
Figure 9:
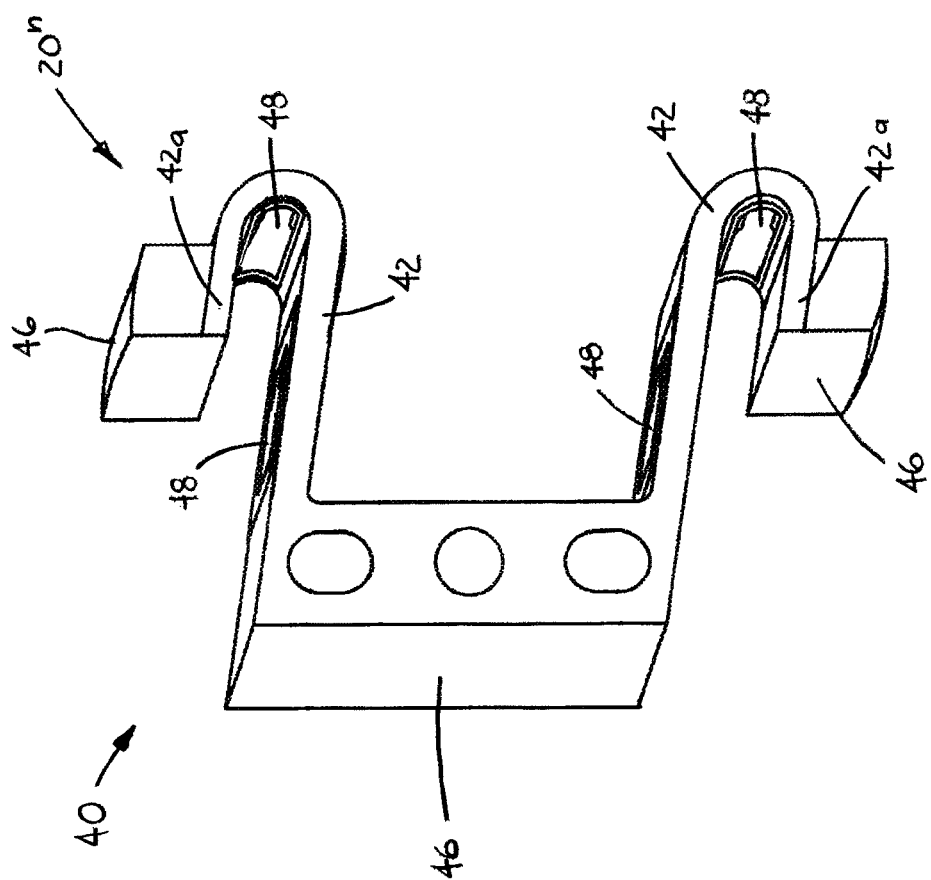
FIG. 9 is a perspective view of a preferred sensor assembly.

Referring now to FIGS. 8 and 9, the sensors $20^1$, $20^2$, $20^3$ ... $20''$ are preferably furnished preassembled on a frame 30 sized to be disposeable within the roller body bore 18. The frame 30 preferably includes a pair of tube halves 32 (only one shown) which together form a tubular body (not shown) disposeable within the bore 18. Each tube half 32 has cavities 33 for receiving the load sensors $20^1$, $20^2$, $20^3$ ... $20''$ and various electronic components, such as the acceleration sensor 22, the processor 24, the transmitter 26, etc., such components preferably being disposed one or more printed circuit boards ("PCB") 28 attached to at least one of the tube halves 32. Further, the tube halves 32 are preferably connected together by two opposing end caps 38A, 38B. Although preferably formed as a pair of tube halves 32, the frame 30 may be formed in any other appropriate manner, such as one or more mounting plates, an assembly of structural bars or members, etc. (no alternatives shown).

In any case, with the frame 30, a reference position $P_{FR}$ is selected on the frame 30 and the first sensor $20^1$ is mounted on the frame 30 at a first position located the first distance D1 from the selected frame reference position $P_{FR}$ and the second load sensor $20^2$ is mounted on the frame 30 at a second position located the second distance D2 from the frame reference position $P_{FR}$, and preferably the third sensor $20^3$ is mounted on the frame 30 at a third position located the third distance D3 from the frame reference position $P_{FR}$. Therefore, the two or more sensors $20''$ may be situated at the desired locations within the rolling body bore 18 simply by positioning the frame 30 within the bore 18 such that the reference position $P_{FR}$ on the frame 30 is located at the desired reference axial position $P_R$. However, the sensorized roller 10 may be fabricated without any frame and with the sensors $20^1$, $20^2$, $20^3$ ... $20''$ being separately installed and fixed within the bore 18 by any appropriate means.

Referring particularly to FIG. 9, each sensor $20''$ is preferably provided as a sensor assembly 40 including at least one and preferably two cantilever beams 42 each extending generally along (i.e., generally parallel to) the central axis $A_C$ and connected with a base member 44. A contact element 46 is mounted on the free end $42a$ of each beam 42 and is disposed against the inner surface 19 of the bore 18. As such, radial strain or deflection of the roller body 16 under loading radially displaces the contact element 46 and deflects each beam 42 radially with respect to the central axis $A_C$. Further, at least one and preferably several sensors 48, each preferably a strain gauge, is/are disposed on each beam 42 and is configured to measure bending of the beam 42, which provides a corresponding indication of radial loading F on the rolling element body 16 in the vicinity of the contact element 46. As such, the load measurement Ln taken by each sensor $20''$ is the average of the measurements taken by all of the sensors 48 from loading detected at two distinct locations about the circumference of the rolling element 10.

Most preferably, each sensor assembly 40 is formed substantially identically as the load cells disclosed in U.S. Pat. No. 10,082,178 owned by Aktiebolaget S K F and issued on Sep. 25, 2018, which is incorporated by reference herein in its entirety. However, the sensors $20''$ may be formed in any other appropriate manner, such as for example, one or more strain gauges directly mounted on the inner circumferential surface 19 of the bore 18, as a piezoelectric tube or stack mounted within the bore 18 and positioned to measure deflection of the rolling element body 16, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method of determining the center of loading of a rolling element, the rolling element being disposed between and rotatably coupling a bearing inner race and a bearing outer race, the method comprising the steps of:
   providing a rolling element body and at least two load sensors;
   forming a cavity within the rolling element body such that an axis extends through the cavity;
   positioning a first one of the two load sensors within the cavity at a first distance (D1) along the axis from a reference axial position and positioning a second one of the two load sensors within the cavity at a second distance (D2) along the axis from the reference axial position, the second distance (D2) having a value different than a value of the first distance (D1);

disposing the rolling element body between the first race and the second race;

taking a first load measurement (L1) using the first sensor and a second load measurement (L2) using the second sensor as the rolling element body traverses a circular path between the first race and the second race; and calculating a center of loading on the rolling element body using the following equation:

$$\text{center of loading} = \frac{L1*D1 + L2*D2}{L1+L2}$$

2. The method as recited in claim 1 wherein:

the step of providing at least two sensors includes providing three sensors; the step of positioning the first and second sensors includes positioning a third one of the three load sensors within the cavity at a third distance (D3) along the axis from the reference axial position;

the step of taking the first and second load measurements includes taking a third load measurement (L3) using the third sensor; and the step of calculating the center of loading includes using the following equation:

$$\text{center of loading} = \frac{L1*D1 + L2*D2 + L3*D3}{L1+L2+L3}$$

3. The method as recited in claim 1 further comprising the steps of:

providing an acceleration sensor;

disposing the acceleration sensor within the cavity of the rolling element;

taking an acceleration measurement using the acceleration sensor at each one of a plurality of positions of the rolling element body about the circular path;

calculating a location of each one of the positions of the rolling element body about the circular path using the acceleration measurement taken at the one position;

taking the first load measurement, the second load measurement and the third load measurement and calculating the center of loading at each one of the calculated locations on the circular path; and correlating each calculated center of loading with each one of the calculated locations.

4. The method as recited in claim 3 further comprising the step of plotting the calculated center of loading at each calculated position on the path so as to form a graph.

5. The method as recited in claim 1 further comprising the steps of:

providing a processor; and disposing the processor within the cavity of the roller such that the process is electrically connected with each one of the first sensor, the second sensor and the third sensor;

wherein the step of calculating the center of loading is performed by the processor.

6. The method as recited in claim 5 further comprising the steps of:

providing a transmitter;

disposing the transmitter within the cavity of the roller such that the transmitter is electrically connected with the processor; and transmitting signals using the transmitter, each signal corresponding to a calculated center of loading.

7. The method as recited in claim 1 wherein the step of providing at least two load sensors includes:

providing a frame;

selecting a reference position on the frame corresponding to the reference axial position; and mounting the first load sensor on the frame at a first position located the first distance from the selected reference position and mounting the second load sensor on the frame at a second position located the second distance from the selected reference position.

8. The method as recited in claim 7 wherein the step of positioning the first sensor and the second sensor within the cavity of the roller includes positioning the frame within the cavity such that the reference position on the frame is located at the reference axial position.

9. The method as recited in claim 1 wherein the step of providing at least two load sensors include providing two sensor assemblies, each sensor assembly including at least one cantilever beam extending generally along the central axis, a contact element mounted on the beam and disposed against an inner surface of the cavity such that radial strain of the roller deflects the beam radially with respect to the central axis, and a sensor disposed on the beam and configured to measure bending of the beam.

10. A method of determining the center of loading of a rolling element, the rolling element being disposed between and rotatably coupling a bearing inner race and a bearing outer race, the method comprising the steps of:

providing a rolling element body, the rolling element body having two opposing axial ends, a bore extending between the two axial ends and a central axis extending through the bore, and a number (n) of load sensors;

positioning each one of the number (n) of load sensors within the bore at a separate distance (Dn) along the axis from a reference axial position, the value of each distance (Dn) being different than the value of each other distance (Dn);

disposing the rolling element body between the first race and the second race;

taking a load measurement (Ln) using each one of the number (n) of the sensors; and calculating a center of loading on the rolling element body using the following equation:

$$\text{center of loading} = \frac{L1*D1 + L2*D2 + L3*D3 \ldots + Ln*Dn}{L1+L2+L3 \ldots +Ln}$$

11. The method as recited in claim 10 further comprising the steps of:

providing an acceleration sensor;

disposing the acceleration sensor within the bore of the rolling element;

taking an acceleration measurement using the acceleration sensor at each one of a plurality of positions of the rolling element body about the circular path;

calculating a location of each one of the positions of the rolling element body about the circular path using the acceleration measurement taken at the one position;

taking the number (n) of load measurements and calculating the center of loading at each one of the calculated locations on the circular path; and correlating each calculated center of loading with each one of the calculated locations.

12. The method as recited in claim 10 further comprising the steps of:

providing a processor; and disposing the processor within the cavity of the roller such that the process is electrically connected with each one of the number (n) of sensors;

wherein the step of calculating the center of loading is performed by the processor.

13. The method as recited in claim 12 further comprising the steps of:

providing a transmitter;

disposing the transmitter within the cavity of the roller such that the transmitter is electrically connected with the processor; and transmitting signals using the transmitter, each signal corresponding to a calculated center of loading.

14. The method as recited in claim 10 wherein the step of providing a number (n) of load sensors includes:

providing a frame;

selecting a reference position on the frame corresponding to the reference axial position; and mounting each one of the number (n) of load sensors at a separate position on the frame, each position being located a distance (Dn) from the reference position on the frame that is different than the distance (Dn) from the reference position of each other position on the frame.

15. A sensorized roller for a bearing having an inner race and an outer race, the sensorized roller comprising:

a body disposeable between the inner race and the outer race and having two opposing axial ends, a bore extending between the two axial ends, and a central axis extending through the bore;

a first load sensor disposed within the bore so as to be located at a first distance (D1) along the axis from a reference axial position and a second load sensor disposed within the bore so as to be located at a second distance (D2) along the axis from the reference axial position, the second distance (D2) having a value different than a value of the first distance (D1); and a processor disposed within bore of the rolling element body and electrically connected with each one of the first load sensor and the second load sensor, the processor being configured to calculate an axial position of the center of loading on the rolling element body from measurements received from each one of the first load sensor and the second load sensor.

16. The sensorized roller as recited in claim 15 wherein the processor is programmed to calculate the axial position of the center of loading using the following equation:

$$\text{center of loading} = \frac{L1 * D1 + L2 * D2}{L1 + L2}$$

17. The sensorized roller as recited in claim 15:

further comprising an acceleration sensor disposed within the bore of the rolling element body, electrically connected with the processor and configured to measure acceleration of the rolling element body as the body traverses a circular path between the inner and outer race; and wherein the processor is configured to calculate a location of each one of a plurality of positions about the circular path and to correlate the calculated axial position of the center of loading at each position with the calculated location of each position.

18. The sensorized roller as recited in claim 15 further comprising a frame disposeable within the bore of the rolling element body, the first sensor being mounted on the frame at a first position located the first distance from a selected reference position on the frame and the second sensor being mounted on the frame at a second position located the second distance from the selected reference position.

19. The sensorized roller as recited in claim 15 wherein each load sensor is provided by a sensor assembly including at least one cantilever beam extending generally along the central axis, a contact element mounted on the beam and disposed against an inner surface of the cavity such that radial strain of the roller deflects the beam radially with respect to the central axis, and a strain sensor disposed on the beam and configured to measure bending of the beam.

* * * * *